US012716350B2

(12) United States Patent
Avellar et al.

(10) Patent No.: US 12,716,350 B2
(45) Date of Patent: Aug. 25, 2026

(54) MONITORING DRILLING PARAMETERS

(71) Applicant: Schlumberger Technology Corporation, Sugar Land, TX (US)

(72) Inventors: Louisa Avellar, Cambridge (GB); Navish Makkar, Katy, TX (US); Dwayne Terracina, Spring, TX (US); Ashley Bernard Johnson, Milton (GB); Jonathan Robert Hird, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/894,956

(22) Filed: Sep. 24, 2024

(65) Prior Publication Data

US 2025/0163798 A1 May 22, 2025

Related U.S. Application Data

(63) Continuation of application No. 18/783,506, filed on Jul. 25, 2024.

(60) Provisional application No. 63/515,372, filed on Jul. 25, 2023.

(51) Int. Cl.

| | |
|---|---|
| ***E21B 47/017*** | (2012.01) |
| ***E21B 7/04*** | (2006.01) |
| ***E21B 44/00*** | (2006.01) |
| ***E21B 47/013*** | (2012.01) |
| ***G01L 5/00*** | (2006.01) |

(52) U.S. Cl.

CPC .............. *E21B 47/017* (2020.05); *E21B 7/04* (2013.01); *E21B 44/00* (2013.01); *E21B 47/013* (2020.05); *G01L 5/0061* (2013.01)

(58) Field of Classification Search

CPC .......... E21B 7/04; E21B 47/01; E21B 47/007; E21B 44/04; E21B 47/017

See application file for complete search history.

(56) References Cited

U.S. PATENT DOCUMENTS

| | | | |
|---|---|---|---|
| 9,663,996 B2 | 5/2017 | Yao | |
| 11,761,749 B2 | 9/2023 | Pan et al. | |
| 2005/0150689 A1 | 7/2005 | Jogi et al. | |
| 2006/0045408 A1 | 3/2006 | Jones | |
| 2012/0016589 A1 | 1/2012 | Li | |
| 2015/0218934 A1* | 8/2015 | Turner .................... | E21B 47/02 175/45 |

(Continued)

FOREIGN PATENT DOCUMENTS

| | | |
|---|---|---|
| CN | 109780988 A | 5/2019 |
| WO | 2014158622 A1 | 10/2014 |

*Primary Examiner* — Tara Schimpf

*Assistant Examiner* — Lamia Quaim

(74) *Attorney, Agent, or Firm* — Jeffrey D. Frantz

(57) ABSTRACT

Methods and systems are provided for monitoring operational characteristics of a drilling system that includes a bottom hole assembly having a drill collar operably coupled to a drill bit. A device having an elongate beam and at least one pair of sensors is rigidly secured to a part of the bottom hole assembly to measure strain in the part of the bottom hole assembly. The measurement of strain can be used to derive a measurement of at least one operational parameter of the drilling system, such as dog leg severity of a wellbore, torque on bit, and/or weight on bit.

16 Claims, 15 Drawing Sheets

(56) References Cited

U.S. PATENT DOCUMENTS

| | | | |
|---|---|---|---|
| 2021/0033477 | A1 | 2/2021 | Sihler |
| 2021/0131264 | A1 | 5/2021 | Dunbar |

* cited by examiner

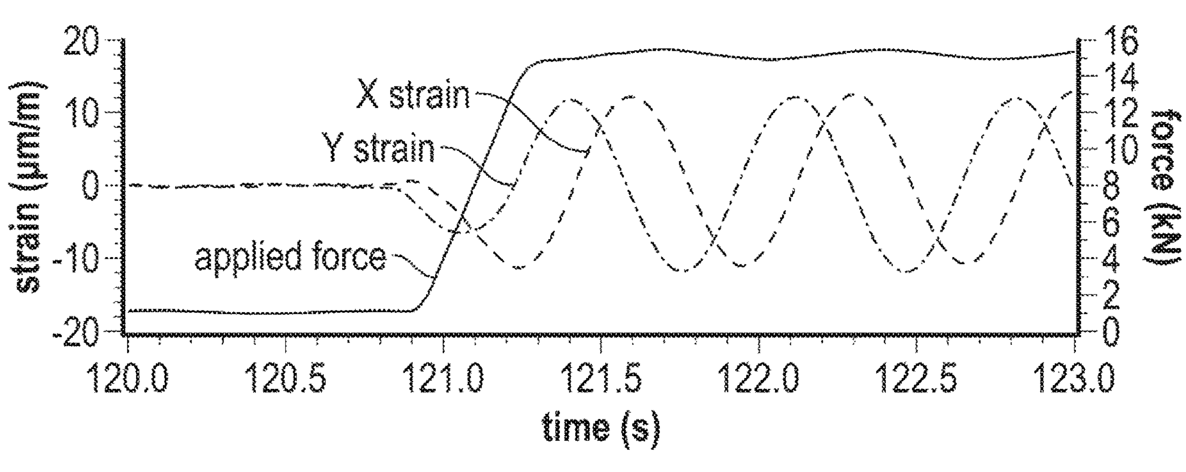
FIG. 6
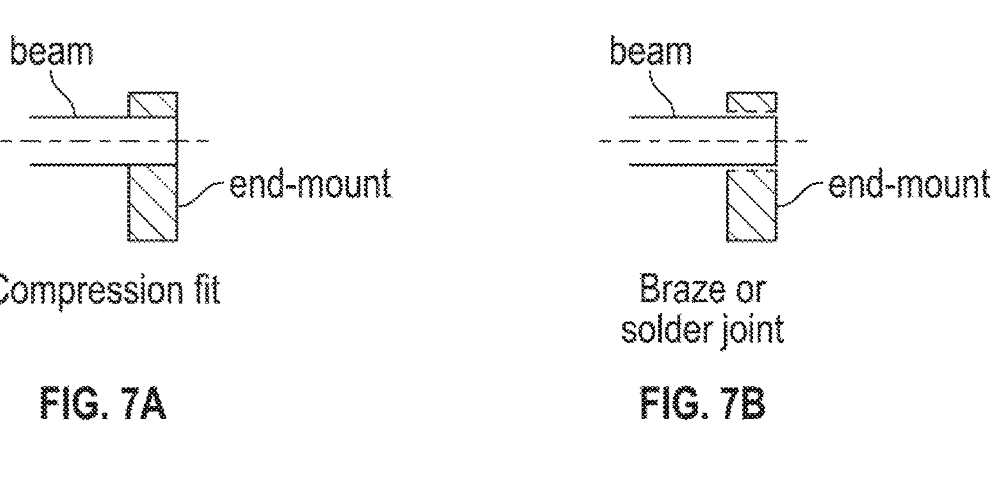
FIG. 7A
FIG. 7B
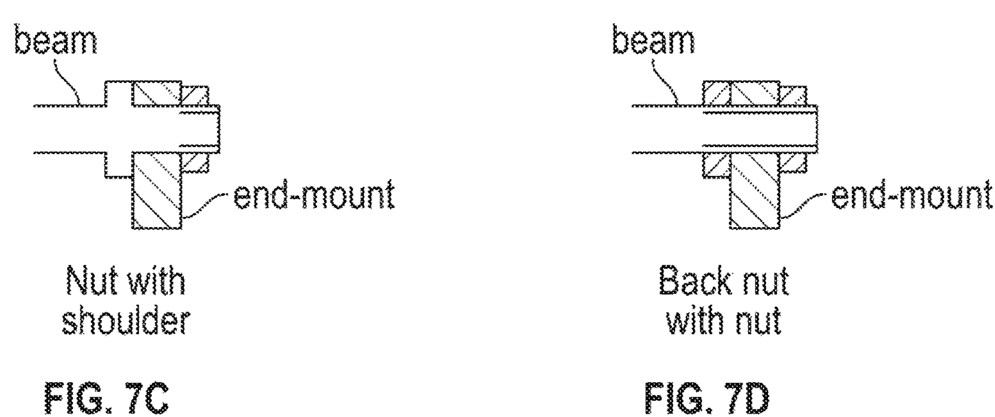
FIG. 7C
FIG. 7D

MONITORING DRILLING PARAMETERS

CROSS-REFERENCE TO RELATED APPLICATION(S)

The present disclosure claims priority from U.S. Prov. Appl. No. 63/515,372, filed on Jul. 25, 2023, and U.S. patent application Ser. No. 18/783,506 filed on Jul. 25, 2024 incorporated herein by reference in its entirety.

BACKGROUND

Present-day drilling systems typically employ a bottom-hole assembly (BHA) that includes a drill collar operably coupled to a drill bit. The drill collar comprises thick-walled and heavy tubular elements with limited flexibility. The drill collar can provide for weight on the drill bit and/or act as a shock absorber to dampen the vibrations and impact forces caused by drilling.

When drilling a wellbore, accurately tracking the curvature of the wellbore path may be important to ensure that the wellbore path intersects the target subterranean formation. Tracking and feedback of control inputs may be of particular importance during directional drilling operations. Typically, a measurement while drilling (MWD) system takes a survey of the wellbore orientation while the drill string is not moving to improve accuracy. The survey may include measurements by one or more sensors including, for example, accelerometers, magnetometers, and gyros.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Methods and systems are provided for monitoring operational characteristics of a drilling system that includes a bottom hole assembly having a drill collar operably coupled to a drill bit. A device having an elongate beam equipped with at least one pair of sensors is rigidly secured to a part of the bottom hole assembly to measure strain in the part of the bottom hole assembly. The measurement of strain can be used to derive a measurement of at least one operational parameter of the drilling system, such as dog leg severity of a wellbore, torque on bit, and/or weight on bit. The measurement of strain over time can also be used to optimize drilling operations or evaluate tool performance or component reliability.

In embodiments, the at least one pair of sensors can be configured to measure bending strain in the part of the bottom hole assembly. The at least one operational parameter can be derived from the measured bending strain. The at least one operational parameter can include a dog leg severity of a wellbore being drilled by the bottom hole assembly.

In embodiments, closed loop control of direction of drilling can be performed based on the dog leg severity derived from the measured bending strain.

In embodiments, the at least one pair of sensors can include a single pair of sensors configured to measure bending strain in the part of the bottom hole assembly as the bottom hole assembly rotates.

In embodiments, the at least one pair of sensors can include two pairs of sensors configured to measure bending strain in the part of the bottom hole assembly without requiring rotation of the bottom hole assembly.

In embodiments, the at least one pair of sensors can include two pairs of sensors configured to measure bending strain in the part of the bottom hole assembly in two orthogonal axes.

In embodiments, a measure of curvature of the bottom hole assembly can be derived from the measured bending strain using a correlation function that relates bending strain to curvature of the bottom hole assembly. Dog leg severity can be calculated based on the measure of curvature of the bottom hole assembly.

In embodiments, the at least one pair of sensors can be configured to measure torsional strain in the part of the bottom hole assembly. The at least one operational parameter can be derived from the measured torsional strain. The at least one operational parameter can include torque on bit of the drilling system.

In embodiments, the at least one pair of sensors can be configured to measure axial strain in the part of the bottom hole assembly. The at least one operational parameter can be derived from the measured axial strain. The at least one operational parameter can include weight on bit of the drilling system.

In embodiments, one or more devices with an elongate beam equipped with sensors can be configured to measure strain in the part of the bottom hole assembly, wherein the measured strain is selected from bending strain, torsional strain, axial strain, or combinations thereof.

In embodiments, the part of the bottom hole assembly can be a drill collar.

In embodiments, the part of the bottom hole assembly can be a cover of an instrumentation pocket.

In embodiments, the part of the bottom hole assembly can be a pin of the drill bit.

In embodiments, the device can include end mounts for rigidly securing the beam to the part of the bottom hole assembly.

In embodiments, bolts can be used to secure the end mounts to the part of the bottom hole assembly.

In embodiments, the structural epoxy can be applied at an interface of the end mounts and the part of the bottom hole assembly.

In embodiments, the end mounts, the beam, and the at least one pair of sensors can be disposed within a recess defined by the part of the bottom hole assembly.

In embodiments, the end mounts can be equipped with sensors configured to measure strain in a direction orthogonal to the longitudinal axis of the beam.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 6 is a plot of data measured by the device of FIGS. 3A and 3B during a drilling test carried out using the testing apparatus of FIG. 5;

FIGS. 7A to 7D illustrate various configurations that can be used to rigidly fix and secure the beam to the end-mounts of the device of FIGS. 3A and 3B to ensure that bending is consistent in the beam and in the end-mounts;

DETAILED DESCRIPTION

The particulars shown herein are by way of example and for purposes of illustrative discussion of the embodiments of the subject disclosure only and are presented in the course of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Figure 1:
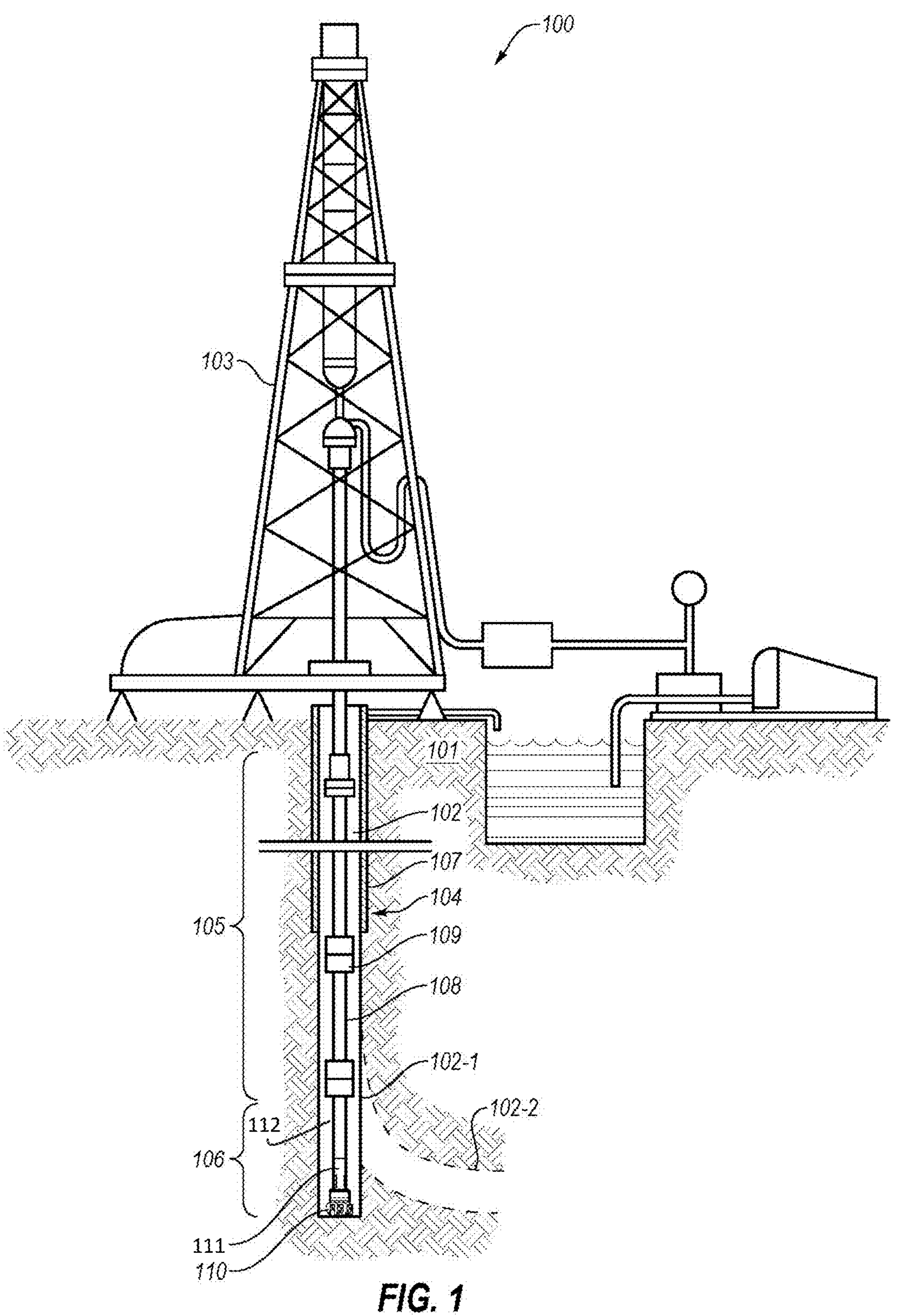
FIG. 1 is a schematic diagram of an example drilling system according to at least one embodiment of the present disclosure.

By way of background, FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105 operably coupled to a bottomhole assembly (BHA) 106 with a bit 110.

The drill string 105 can include several sections of drill pipe 108 connected end-to-end through tool joints 109. The drill string 105 transmits drilling fluid through a central bore and transmits rotational power from the drill rig 103 to the BHA 106 and the bit 110. In some embodiments, the drill string 105 may further include additional components such as subs, pup joints, etc. The drill pipe 108 provides a hydraulic passage through which drilling fluid is pumped from the surface. The drilling fluid discharges through nozzles, jets, or other orifices in the bit 110 for the purposes of cooling the bit 110 and cutting structures thereon, for lifting cuttings out of the wellbore 102 as it is being drilled, for controlling influx of fluids in the well, for maintaining the wellbore integrity, and for other purposes.

An example BHA 106 may include additional or other components (e.g., coupled between/to the drill string 105 and the bit 110). Examples of additional BHA components include a drill collar 111 mounted to the bit 110, stabilizers, measurement-while-drilling (MWD) tools, logging-while-drilling (LWD) tools, downhole motors, underreamers, section mills, hydraulic disconnects, jars, vibration or damping tools, other components, or combinations of the foregoing. The BHA 106 may further include a directional tool 112 such as a bent housing motor or a rotary steerable system (RSS). The directional tool 112 may include directional drilling tools that change direction of the bit 110, and thereby the trajectory of the wellbore. In some cases, at least a portion of the directional tool 112 may maintain a geostationary position relative to an absolute reference frame, such as gravity, magnetic north, or true north. Using measurements obtained with the geostationary position, the directional tool 112 may locate the bit 110, change the course of the bit 110, and direct the directional tool 112 on a projected trajectory. For instance, although the BHA 106 is shown as drilling a vertical portion 102-1 of the wellbore 102, the BHA 106 (including the directional tool 112) may instead drill directional or deviated well portions, such as directional portion 102-2.

In general, the drilling system 100 may include additional or other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

In some embodiments, the BHA 106 may include a downhole motor to power downhole systems and/or provide rotational energy for downhole components (e.g., rotate the bit 110, drive the directional tool 112, etc.). The downhole motor may be any type of downhole motor, including a positive displacement pump (such as a progressive cavity motor) or a turbine. In some embodiments, a downhole motor may be powered by the drilling fluid flowing through the drill pipe 108. In other words, the drilling fluid pumped downhole from the surface may provide the energy to rotate a rotor in the downhole motor. The downhole motor may operate with an optimal pressure differential or pressure differential range. The optimal pressure differential may be the pressure differential at which the downhole motor may not stall, burn out, overspin, or otherwise be damaged. In some cases, the downhole motor may rotate the bit 110 such that the drill string 105 may not be rotated at the surface, or may rotate at a different rate (e.g., slower) than the rotation of the bit 110.

The bit 110 in the BHA 106 may be any type of bit suitable for degrading downhole materials such as earth formation 101. Example types of drill bits used for drilling earth formations are fixed-cutter or drag bits, roller cone bits, and combinations thereof. In other embodiments, the bit 110 may be a mill used for removing metal, composite, elastomer, other downhole materials, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface or may be allowed to fall downhole. In still other embodiments, the bit 110 may include a reamer. For instance, an underreamer may be used in connection with a drill bit and the drill bit may bore into the formation while the underreamer enlarges the size of the bore.

In embodiments, at least one pair of strain gauge sensors can be mounted on a beam that is rigidly fixed and secured to a part or device of interest of the drilling system, such as the drill collar 111 of the BHA 106. The strain gauge sensor is a transducer that allows the measurement of mechanical strain in an object. In embodiments, the at least one pair of strain gauge sensors can be mounted on the beam and configured to detect bending strain of the drilling system part (e.g., drill collar 111) to which the beam is rigidly fixed and secured.

In embodiments, the at least one pair of strain gauge sensors can provide variable resistance that depends on the bending strain of the drilling system part (e.g., drill collar 111 or other part of the BHA 106) to which the beam is rigidly fixed and secured. In embodiments, the beam as described herein can have a cylindrical profile (with a thin-walled or solid construction) with symmetrical stiffness. Alternatively, the beam can have a square, octagonal or other cross-sectional profile (with a thin-walled or solid construction).

In embodiments, the at least one pair of strain gauge sensors may be electrically coupled to sensor electronics, which may receive electrical signals from the at least one pair of strain gauge sensors. In some embodiments, the sensor electronics may log measurement data derived from the electrical signals supplied by the at least one pair of strain gauge sensors and store the measurement data in electronic memory for subsequent processing or transmission. In embodiments, the at least one pair of strain gauge sensors can be configured as part of a Wheatstone bridge (or half-Wheatstone bridge with passive resistors) that generates an electrical output signal (e.g., differential voltage signal) that represents the measured strain as is well known in the electronic arts. The electrical output signal that represents the measured strain can be processed (for example, by analog signal processing for filtering) and converted into digital form for storage as the measurement data stored in electronic memory for subsequent processing or transmission.

Figure 2A:
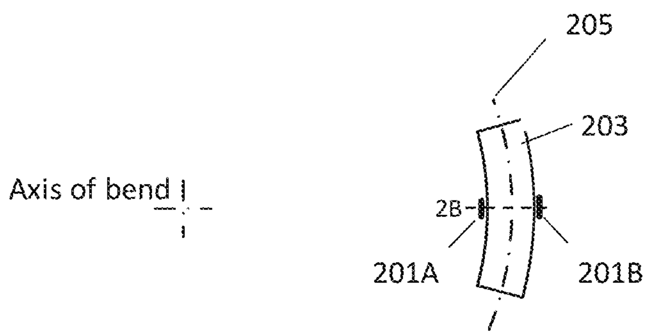
FIG. 2A is a schematic diagram of an example device for measuring bending strain according to at least one embodiment of the present disclosure.

In one embodiment, a pair of strain gauge sensors 201A, 201B can be mounted on the exterior surface of an elongate beam 203 at positions offset by a predefined separation perpendicular to the central longitudinal axis 205 of the beam 203 as shown in FIG. 2A. In this configuration, the pair of strain gauge sensors 201A, 201B measure bending of the beam 203 along the central longitudinal axis 205 of the beam 203 as shown. The beam 203 with strain gauge sensors 201A, 201B can be rigidly fixed and secured to a drilling system part (such as the drill collar 111 or other part of the BHA 106). In this configuration, the pair of strain gauge sensors 201A, 201B measure bending strain of the drilling system part (e.g., drill collar 111 or other part of the BHA 106) to which the beam 203 is rigidly fixed and secured as the drilling system part rotates. In embodiments, the beam 203 can be formed by a cylindrical body as depicted in FIG. 2A, and the pair of strain gauge sensors 201A, 201B can be mounted on the exterior surface of the cylindrical body at positions with angular coordinates offset by 180 degrees relative to one another about the circumference of the cylindrical body.

Figure 2B:
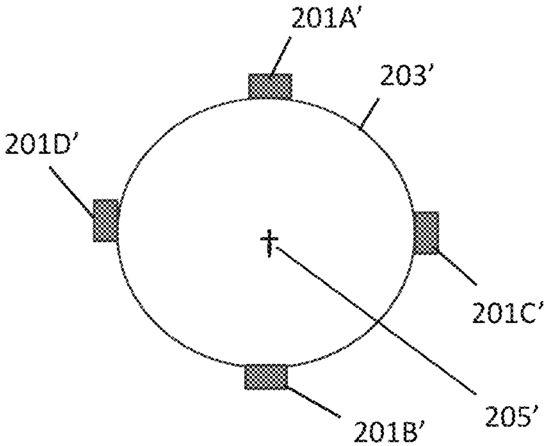
FIG. 2B is a schematic diagram of another example device for measuring bending strain according to at least one embodiment of the present disclosure.

In another embodiment shown in FIG. 2B, two pairs of strain gauge sensors (pair 201A'/201B' and pair 201C'/201D') can be mounted on the exterior surface of an elongate beam 203' at positions offset by predefined separations perpendicular to the central longitudinal axis 205' of the beam 203'. Each one of the two pairs of strain gauge sensors 201A/201B', 201C'/201D' can be mounted orthogonal to one another as shown, or at different orientations. The beam 203' with strain gauge sensors 201A', 201B', 201C', 201D' can be rigidly fixed and secured to a drilling system part (such as the drill collar 111 or other part of the BHA 106). The two pairs of strain gauge sensors (pair 201A'/201B' and pair 201C'/201D') can be configured to measure bending strain of the drilling system part (e.g., drill collar 111 or other part of the BHA 106) to which the beam 203' is rigidly fixed and secured when the drilling system part rotates and when the drill system is stationary (thus, not requiring rotation of the drilling system part). In embodiments, the beam 203' can be formed by a cylindrical body as shown in FIG. 2B, and the two pairs of strain gauge sensors (pair 201A'/201B' and pair 201C'/201D') can be mounted on the exterior surface of the cylindrical body at positions with angular coordinates offset by 90 degrees relative to one another about the circumference of the thin-walled cylindrical body. In this configuration, the strain gauge sensor pair 201A'/201B' are mounted on the exterior surface of the cylindrical body at positions with angular coordinates offset by 180 degrees relative to one another, and the strain gauge sensor pair 201C'/201D' are mounted on the exterior surface of the cylindrical body at positions with angular coordinates offset by 180 degrees relative to one another as shown in FIG. 2B. The strain gauge sensor pair 201A', 201B' can be configured to measure bending strain in an axis along the radius of the drill collar 111 (referred to X-axis bending strain), and the strain gauge sensor pair 201C', 201D' can be configured to measure bending strain in an axis tangential to the drill collar 111 (referred to Y-axis bending strain).

Figure 2C:
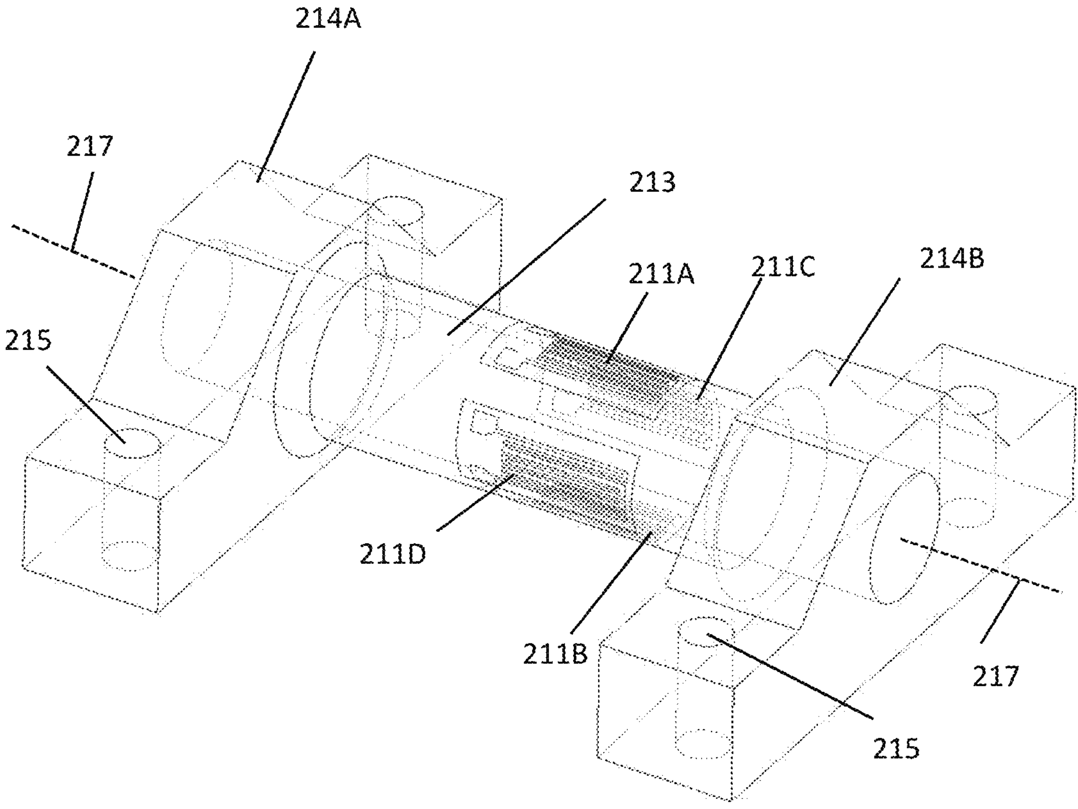
FIG. 2C is a schematic diagram of yet another example device for measuring bending strain according to at least one embodiment of the present disclosure.

In another embodiment shown in FIG. 2C, two pairs of strain gauge sensors (pair 211A/211B and pair 211C/211D) can be mounted on the exterior surface of an elongate beam 213 at positions offset by predefined separations perpendicular to the central longitudinal axis 217 of the beam 213. Each one of the two pairs of strain gauge sensors 211A/211B, 211C/211D can be mounted orthogonal to one another as shown. The beam 213 is rigidly supported by end-mounts 214A, 214B rigidly connected to opposite ends of the beam 213. The end-mounts 214A, 214B can include holes 215 that receive bolts or other mechanical fasteners that are used to rigidly fix and secure the end mounts 214A, 214B and beam 213 to a part of the BHA (e.g., drill collar 111) of the drilling system. In embodiments, structural epoxy can be applied at the interface of the end-mounts 214A, 214B and the part of the BHA (e.g., drill collar 111) of the drilling system. The two pairs of strain gauge sensors (pair 211A/211B and pair 211C/211D) each include interdigitated resistive elements that extend about the exterior surface of the beam 213 parallel to the longitudinal axis 217. In this configuration, the two pairs of strain gauge sensors (pair 211A/211B and pair 211C/211D) measure bending strain of the drilling system part (e.g., drill collar 111 or other part of the BHA 106) to which the beam 213 is rigidly fixed and secured when the drilling system part rotates and when the drill system is stationary (thus, not requiring rotation of the drilling system part). In embodiments, the beam 213 can be formed by a cylindrical body as shown in FIG. 2C, and the two pairs of strain gauge sensors (pair 211A/211B and pair 211C/211D) can be mounted on the exterior surface of the cylindrical body at positions with angular coordinates offset by 90 degrees relative to one another about the circumference of the thin-walled cylindrical body. In this configuration, the strain gauge sensor pair 211A/211B are mounted on the exterior surface of the cylindrical body at positions with angular coordinates offset by 180 degrees relative to one another, and the strain gauge sensor pair 211C/211D are mounted on the exterior surface of the cylindrical body at positions with angular coordinates offset by 180 degrees relative to one another as shown in FIG. 2C. The strain gauge sensor pair 211A, 211B can be configured as part of a bridge circuit (e.g., half-bridge circuit) to measure bending strain in an axis along the radius of the drill collar 111 (referred to X-axis bending strain), and the strain gauge sensor pair 211C, 211D can be configured as part of a bridge circuit (e.g., half-bridge circuit) to measure bending strain in an axis tangential to the drill collar 111 (referred to Y-axis bending strain). The normal strain experienced by the elongate beam 213 can be excluded by the respective bridge circuits.

Figure 2D:
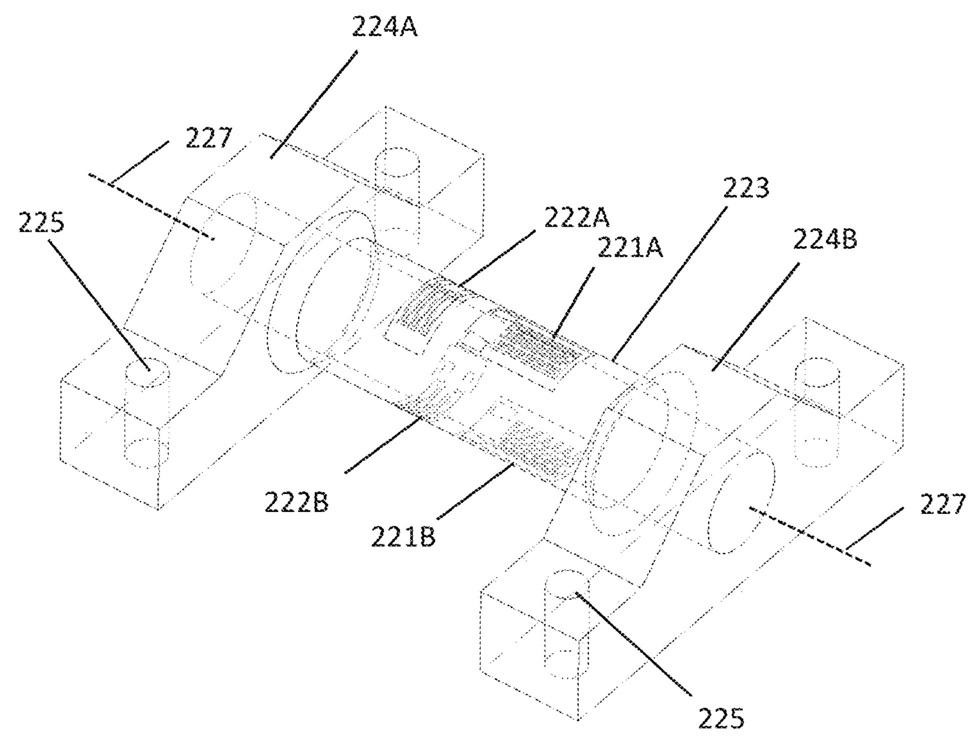
FIG. 2D is a schematic diagram of yet another example device for measuring axial strain according to at least one embodiment of the present disclosure.

In another embodiment shown in FIG. 2D, two pairs of strain gauge sensors (pair 221A/221B and pair 222A/222B) can be mounted on the exterior surface of an elongate beam 223 at predefined positions. The beam 223 is rigidly supported by end-mounts 224A, 224B rigidly connected to opposite ends of the beam 223. The end-mounts 224A, 224B can include holes 225 that receive bolts or other mechanical fasteners that are used to rigidly fix and secure the end mounts 224A, 224B and beam 223 to a part of the BHA (e.g., drill collar 111) of the drilling system. In embodiments, structural epoxy can be applied at the interface of the end-mounts 224A, 224B and the part of the BHA (e.g., drill collar 111) of the drilling system. The strain gauge sensor pair 221A, 221B are mounted on the exterior surface of the beam 223 opposite one another relative to the longitudinal axis 227 at angular coordinates offset by 180 degrees relative to one another as shown in FIG. 2D. The strain gauge sensor pair 221A, 221B each include interdigitated resistive elements that extend about the exterior surface of the beam 213 parallel to the longitudinal axis 227. The strain gauge sensor pair 222A, 222B are also mounted on the exterior surface of the beam 223 opposite one another relative to the longitudinal axis 227 at angular coordinates offset by 180 degrees relative to one another as shown in FIG. 2D. The strain gauge sensor pair 222A, 222B each include interdigitated resistive elements that extend about the exterior surface of the beam 223 orthogonal to the longitudinal axis 227. The two pairs of strain gauge sensors (pair 221A/221B and pair 222A/222B) can be configured as part of a bridge circuit (e.g., full-bridge circuit) that measures axial strain of the drilling system part (e.g., drill collar 111 or other part of the BHA 106) to which the beam 223 is rigidly fixed and secured. The bending strain experienced by the elongate beam 223 can be excluded by the bridge circuit. In embodiments, the beam 223 can be formed by a cylindrical body, and the two pairs of strain gauge sensors (pair 221A/221B and pair 222A/222B) can be mounted on the exterior surface of the cylindrical body as shown in FIG. 2D.

Figure 2E:
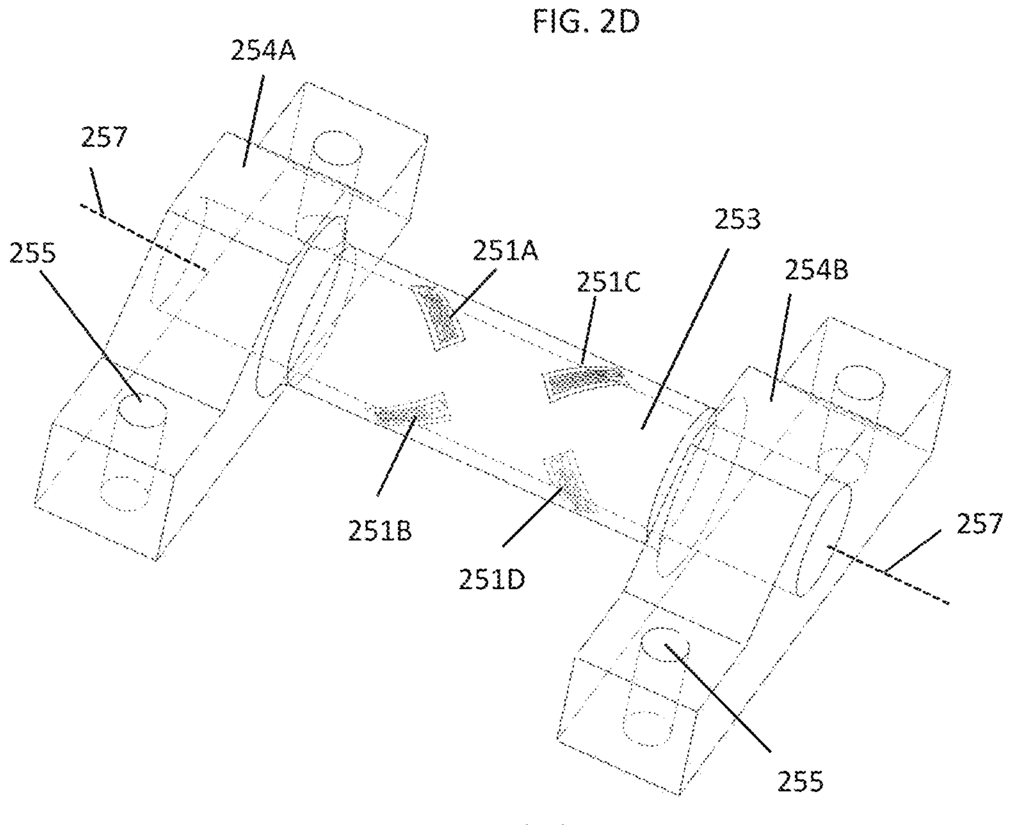
FIG. 2E is a schematic diagram of yet another example device for measuring torsional strain according to at least one embodiment of the present disclosure.

In yet another embodiment shown in FIG. 2E, two pairs of strain gauge sensors (pair 251A/251B and pair 251C/251D) can be mounted on the exterior surface of an elongate beam 253 at predefined positions. The beam 253 is rigidly supported by end-mounts 254A, 254B rigidly connected to opposite ends of the beam 253. The end-mounts 254A, 254B can include holes 255 that receive bolts or other mechanical fasteners that are used to rigidly fix and secure the end mounts 254A, 254B and beam 253 to a part of the BHA (e.g., drill collar 111) of the drilling system. In embodiments, structural epoxy can be applied at the interface of the end-mounts 254A, 254B and the part of the BHA (e.g., drill collar 111) of the drilling system. The strain gauge sensor pair 251A, 251B are mounted on the exterior surface of the beam 253 opposite one another relative to the longitudinal axis 257 at angular coordinates offset by 90 degrees relative to one another as shown in FIG. 2E. The strain gauge sensor pair 251C, 251D are mounted on the exterior surface of the beam 253 opposite one another relative to the longitudinal axis 257 at angular coordinates offset by 90 degrees relative to one another as shown in FIG. 2E. The strain gauge sensor pair 251A, 251B each include interdigitated resistive elements that extend about the exterior surface of the beam 253 at opposite 45 degree angles relative to the longitudinal axis 257. The strain gauge sensor pair 251C, 251D each include interdigitated resistive elements that extend about the exterior surface of the beam 253 at opposite 45 degree angles relative to the longitudinal axis 257. The two strain gauge sensor pairs (pair 251A/251B and pair 251C/251D) can be configured as part of a bridge circuit (e.g., full-bridge circuit) to measure torsional strain of the drilling system part (e.g., drill collar 111 or other part of the BHA 106) to which the beam 253 is rigidly fixed and secured. In embodiments, the beam 253 can be formed by a cylindrical body, and the two pairs of strain gauge sensors (pair 251A/251B and pair 251C/251D) can be mounted on the exterior surface of the cylindrical body as shown in FIG. 2E.

Figure 3A:
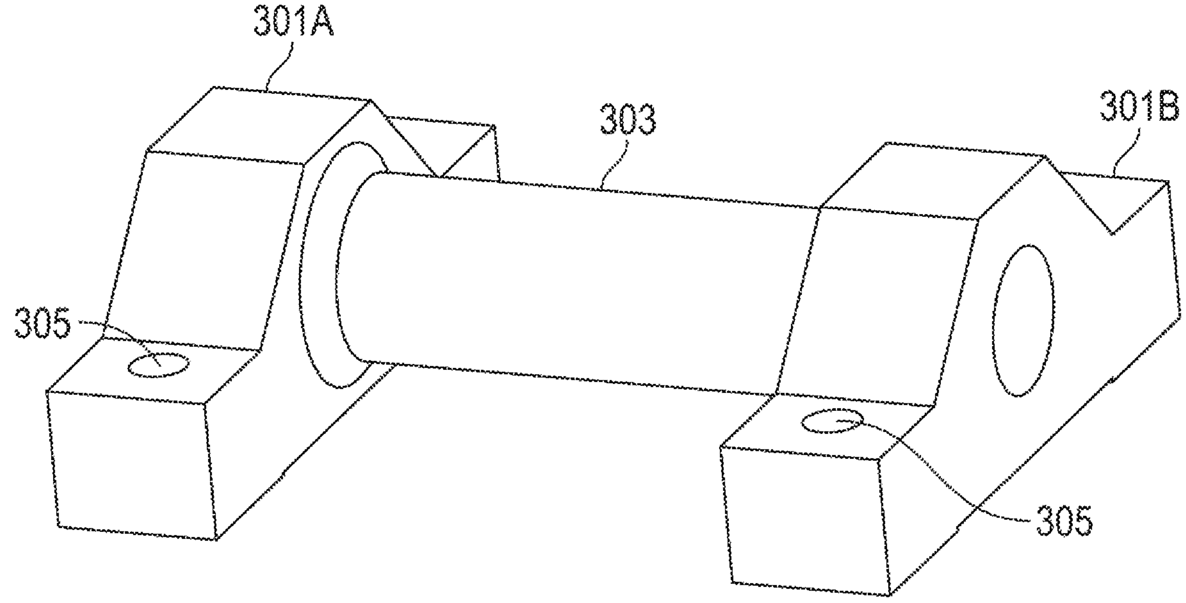
FIG. 3A is a three-dimensional schematic diagram of an example device for measuring strain according to at least one embodiment of the present disclosure.

FIG. 3A illustrates a device for measuring strain. The device includes opposed end-mounts 301A, 301B that rigidly supports an elongate beam 303 that is equipped with at least one pair of strain gauge sensors as described herein. The end-mounts 301A, 301B can include holes 305 that receive bolts or other mechanical fasteners that are used to rigidly fix and secure the device to a part of the BHA (e.g., drill collar 111) of the drilling system. In embodiments, one or more recesses can be formed in a part of the BHA (e.g., drill collar 111) and configured to receive the end-mounts 301A, 301B of the device. Bolts or other fasteners (such as structural epoxy) can be used to rigidly fix and secure the end-mounts 301A, 301B within the corresponding recess(es) in the BHA (e.g., drill collar 111) of the drilling system and thus rigidly secure the device to the part of the BHA.

Figure 3B:
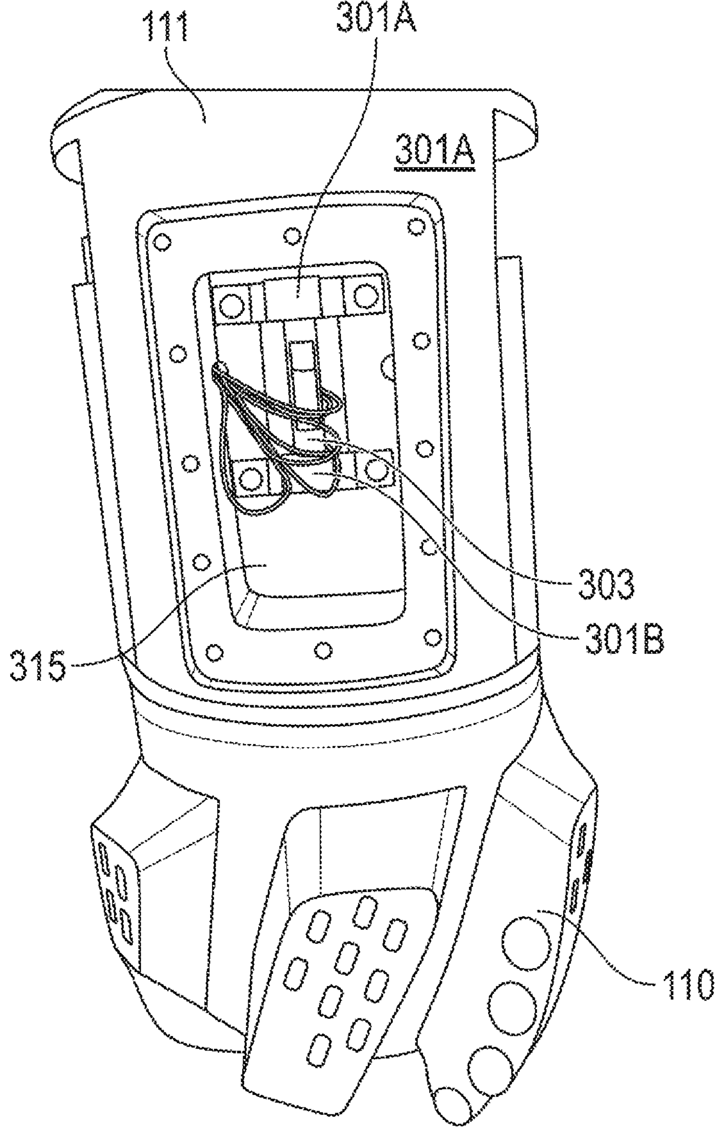
FIG. 3B is an image of the device for measuring strain of FIG. 3A rigidly fixed to a drill collar within a recess of the drill collar according to at least one embodiment of the present disclosure.

FIG. 3B illustrates the device for measuring strain of FIG. 3A rigidly fixed to a drill collar 111 within a recess 315 of the drill collar 111. The recess 315 can be disposed adjacent to the drill bit 110 of the drilling system as shown. A cover (not shown) can be secured to drill collar 111 about the periphery of the recess 315 and cover the recess 315 with a sealed interface to protect the internal components disposed within the recess 315 (including the device for measuring strain) from the external downhole environment (e.g., high pressure drilling fluid and cuttings) while drilling. Structural epoxy can be applied at the interface of the end-mounts 301A, 301B and the exterior surface(s) of the recess 315 to rigidly fix the device for measuring strain of FIG. 3A to the drill collar 111 within the recess 315.

Figure 4A:
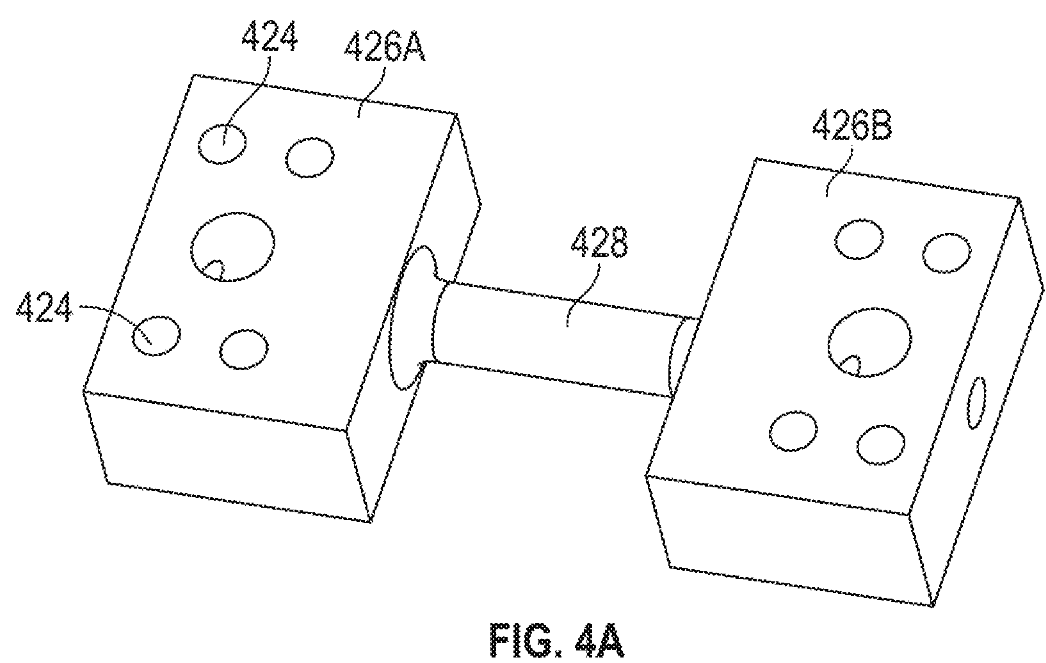
FIGS. 4A through 4E illustrate embodiments of a device for measuring strain in various configurations.
Figure 4B:
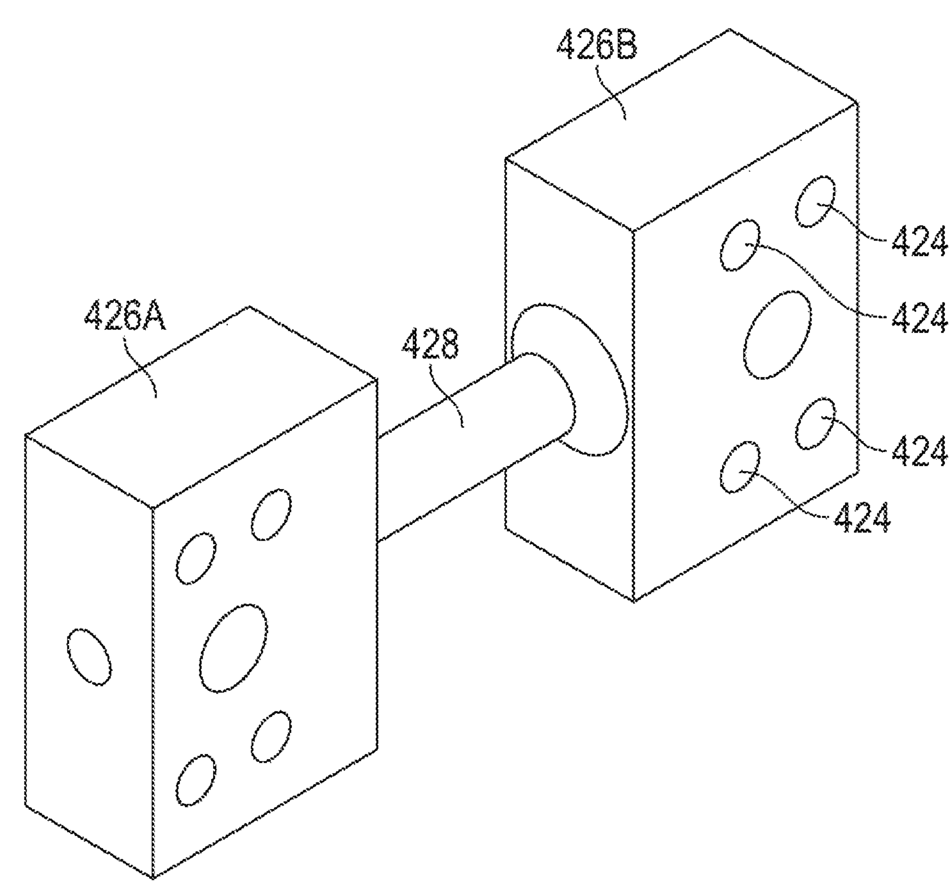

In accordance with numerous embodiments, the device for measuring strain may have any variety of configurations. Such embodiments may be configured to amplify the signal or measurements derived from the device. For example, FIGS. 4A through 4E illustrate embodiments of a device for measuring strain in various configurations. For example, FIGS. 4A and 4B illustrate a device for measuring strain 420 with multiple attachment points 424. The attachment points 424 may be a hole through a mounting structure 426A or 426B to allow for a mechanical attachment method, such as bolts or some other fastener. The mounting structures 426A and 426B can be positioned at opposite ends of the central elongated beam 428 and may be connected thereto or formed with the central elongated beam 428.

In numerous embodiments, the dimensions of mounting structures 426A and 426B may vary with any number of attachment points 424. For example, FIGS. 4A and 4B illustrate an embodiment with mounting structures 426A and 426B that are longer than those illustrated in FIG. 3A. This can allow for additional attachment points 424 (four or more in each) that can subsequently stiffen the connection between the device 420 and the BHA (Shown in FIG. 3B). In various embodiments, the stiffer connection can affect and/or magnify the strain signals produced by the deformation of the central elongated beam 428. Additionally, the position of the attachment points within the mounting structures 426A and 426B can alter or magnify the signals produced by the deformation of the central elongated beam 428. For example, FIGS. 4A and 4B illustrate the position of the attachment points 424 near the outer or outermost ends of the mounting structures 426A and 426B that can help to amplify the signal by isolating the stiff connection between the device 420 and the BHA.

Figure 4C:
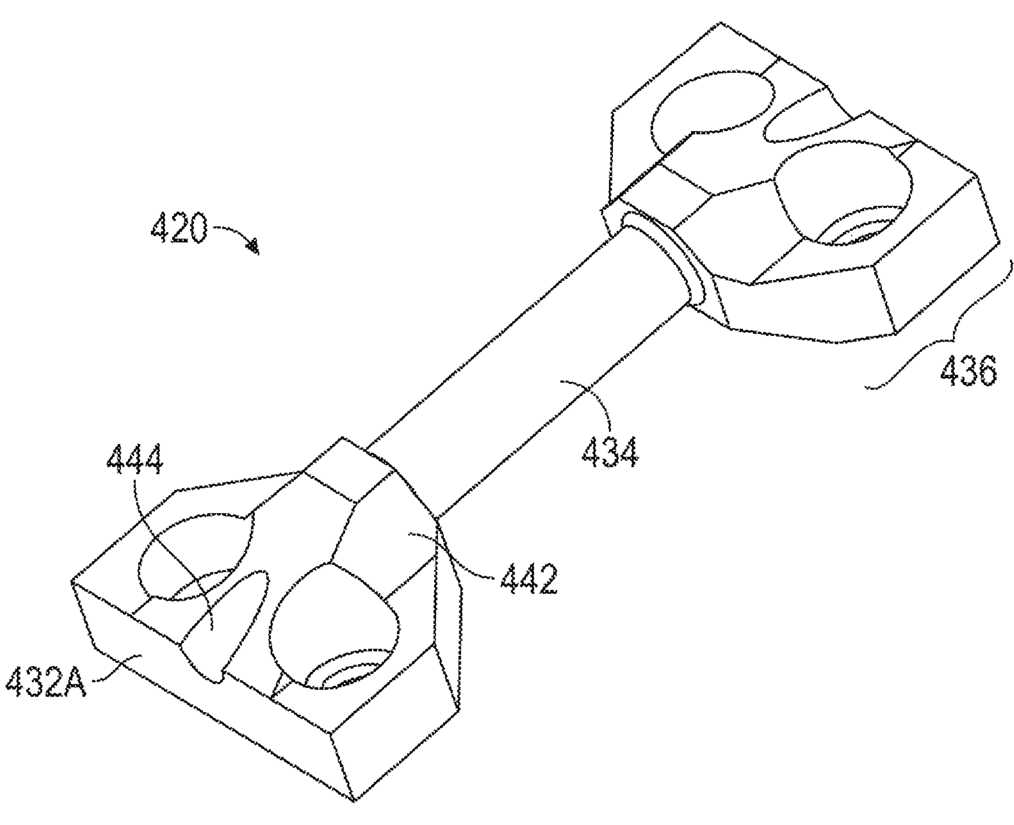
Figure 4D:
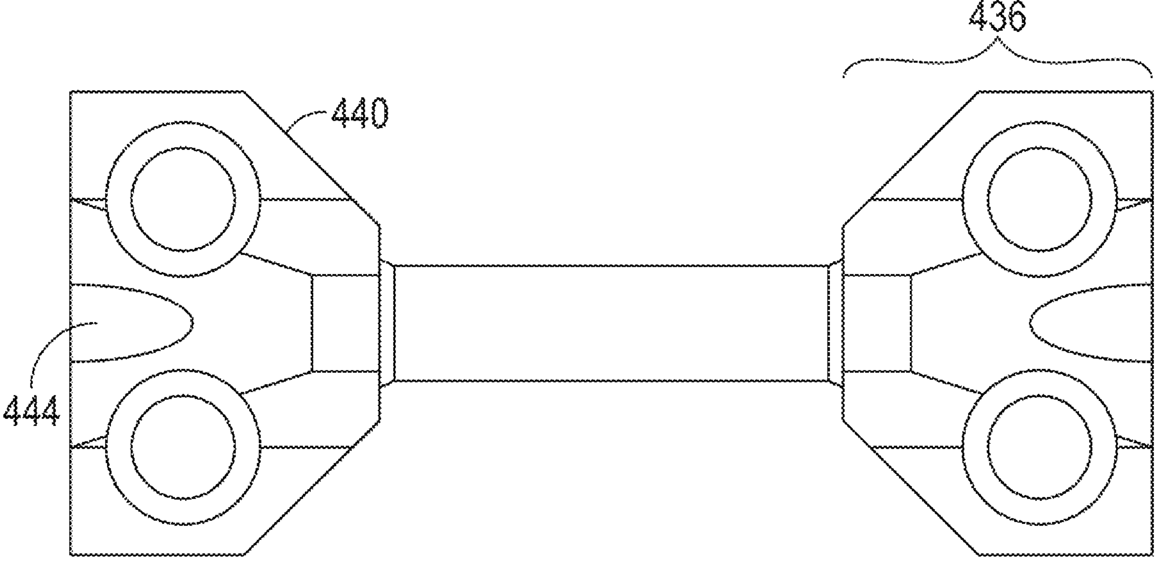

It should be appreciated that the mounting structures can vary in size and shape in accordance with many embodiments of the device 420. For example, FIGS. 4C and 4D illustrates a device 420 with smaller mounting structures 432A and 432B positioned at the ends of an elongated central beam 434. The mounting structures, in accordance with various embodiments, can have a shortened body 436 with at least two attachment holes. The shortened body 436 can also be configured with tapered ends 440 located closest to the elongated central beam. Additionally, the body 436 can be thinner in some portions than the thickness of the centrally elongated beam 434. This can allow for a raised portion 442 that is configured to connect to the central elongated beam 434. The raised portion may have any suitable shape that can allow for the mounting structures 432A and 432B to connect to or be formed with the central elongated beam. The thinner and shortened body 436 can allow for further isolation and magnification of the strain signals produced from the deformation of the elongated beam during use in the BHA. This can ultimately aid in the collection of accurate data for use in further downhole drilling operations. In some embodiments, the mounting structures 432A and 432B may have cut-outs 444 that can be helpful in reducing size and weight of the device. As can be appreciated the design and form factor of the mounting structure can vary and have numerous combinations of features, discussed herein, that ultimately help to improve the strain signal produced from the deformation of the elongated central beam 434.

Figure 4E:
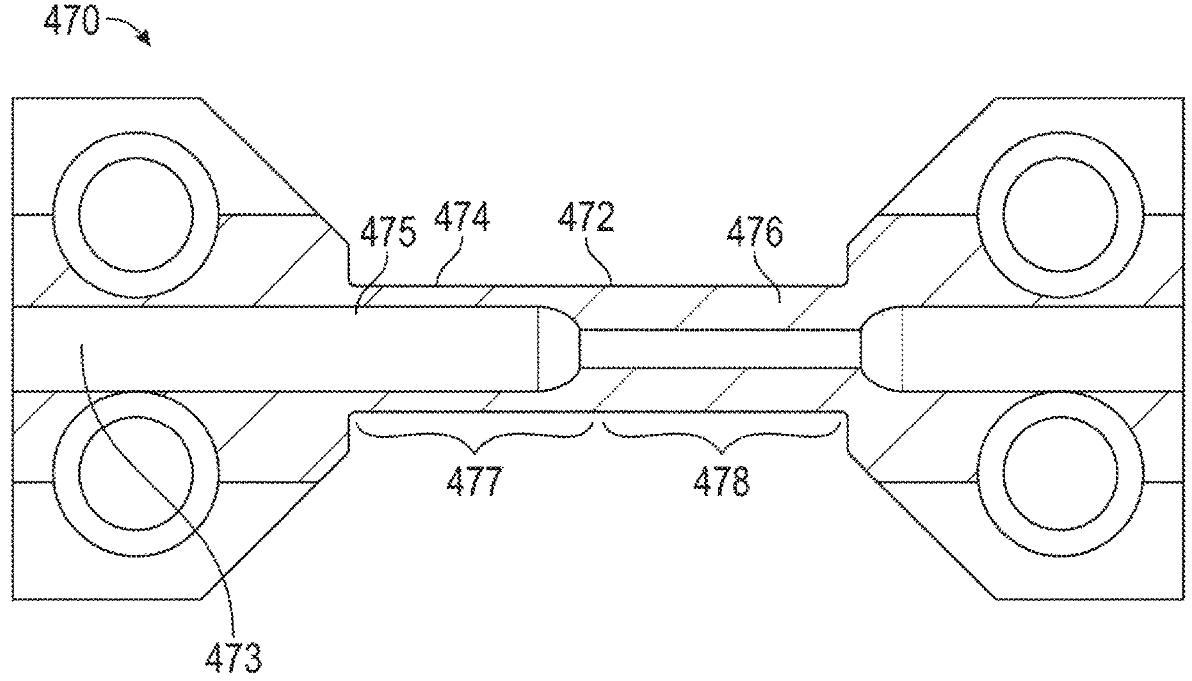

As can be appreciated, the central elongated beam (428, 434) can vary in shape, size, length, and/or configuration to allow for improved strain measurements from the device. For example, the length of the central elongated beam (428, 434) can vary. It may be shorter in some configurations and longer in others. The length may also vary depending on the type and configuration of the attachment structure used. Additionally, many embodiments of the central elongated beam may have a cross-section with variable thickness. For example, FIG. 4E illustrates a cross-sectional view of an embodiment of a device 470 with a central elongated beam 472 that has a varying thickness. In some embodiments, the central elongated beam 472 may have a central channel 473 that runs axially along the length of the device 470. The channel 473 can have an outer wall 474 and an inner wall 475 that extend along the length of the beam 472 and define the central channel 473 and a thickness 476 of the beam 472. The beam 472 can have a first portion 477 and a second portion 478 where at least one of the first or second portions is thicker than the other portion. In other words, material between the inner wall 475 and the outer wall 474 is greater or thicker in one portion than the other. The various thickness of the beam 472 can be used to isolate or focus the strains (bending, torque, weight/load) in a particular portion. This can help to eliminate or reduce the cross-talk between any of the signals (bending, torque, weight/load). Accordingly, the strain measurements can be more accurately recorded and used for future downhole drilling operations.

As should be readily understood, many embodiments of the device for measuring strain, as described herein, can be configured with one or more strain gauges or sensors configured to measure strain. The gauge or sensor can be positioned within or on the device in any suitable position such as within the central channel or on the central elongated beam such that the deformation thereof can be measured by the strain gauge or sensor. The strain gauge or sensor can be affixed to the device by any suitable means to allow for such measurements to be obtained. Additionally, it can be appreciated that the placement of the gauges or sensors can vary in order to obtain a more amplified and accurate signal of the deformation (torque, bending, weight/load) of the device.

When drilling a well, the BHA 106 will align with the trajectory of the hole so the bending of the BHA 106 will track the curvature of the wellbore being drilled. In embodiments, the measurement of bending strain of the drilling system part (e.g., drill collar 111 or other part of the BHA 106) can be used to derive a measurement of the curvature of the BHA. In embodiments, a correlation function can relate the measurement of bending strain to the measurement of the curvature of the BHA. The correlation function can be derived from finite element analysis of the sensor system and drilling system over varying bending loads and/or calibration in a test machine over varying bending loads. Furthermore, the measurement of the curvature of the BHA can be used to derive a measurement of dog leg severity (DLS) of the wellbore being drilled by the drilling system. Dog leg severity represents the change in the angle of the wellbore over a predefined length (such as 100 feet). For example, the measurement of the curvature of the BHA can represent a radius of curvature R, which can be converted to a measurement of dog leg severity (DLS) (in degrees per 100 feet) by the following equation:

$$DLS=100*360/(2*pi*R). \quad (1)$$

The measurement of Dog Leg Severity can be used in a closed loop control system for steering the drill system, which is typically implemented as part of the directional tool 112 (e.g., RSS) of the drilling system.

The measurement of torsional strain of the drilling system part (e.g., drill collar 111 or other part of the BHA 106) can also be used to derive a measurement of Torque on Bit (TOB) of the drilling system. In embodiments, a correlation function can relate the measurement of torsional strain to the measurement of the Torque on Bit (TOB) of the drilling system. The correlation function can be derived from finite element analysis of the sensor system and drilling system over varying torsional loads and/or calibration in a test machine over varying torsional loads.

The measurement of axial strain of the drilling system part (e.g., drill collar 111 or other part of the BHA 106) can also be used to derive a measurement of Weight on Bit (WOB) of the drilling system. The WOB is applied to the bit by applying an axial force to the lower BHA. In embodiments, a correlation function can relate the measurement of axial strain to the measurement of the Weight on Bit (WOB) of the drilling system. The correlation function can be derived from finite element analysis of the sensor system and drilling system over varying axial loads and/or calibration in a test machine over varying axial loads.

The measurement of Torque on Bit (TOB) characterizes the amount of torque applied to the drill bit during drilling. The measurement of Weight on Bit (WOB) characterizes the amount of downward force applied to the drill bit during drilling. These measurements can be used to control and optimize the rate of penetration (ROP) of the drilling by balancing drilling speed with acceptable drill bit wear. The bit lifetime is largely determined by the mechanical conditions at the bit-formation rock interface, and the weight on bit (WOB) and torque on bit (TOB) measurements provide valuable information related to the working condition of the drill bit. In this manner, the measurements of strain of the drilling system part can be used to monitor the primary drilling parameters while drilling and optimize the drilling process.

In addition, the measurements of strain of the drilling system part (e.g., drill collar 111 or other part of the BHA 106) can be monitored over time to characterize the loading of the drilling system over time to evaluate drilling performance or component reliability. For example, the measurement of bending strain (or measurement of DLS derived therefrom) over time can be associated with dimensions of time and wellbore depth. This data can be correlated to one or more relevant drilling parameters (such as WOB, Depth of cut, steering toolface, and steering ratio) as well as the geology of the formation being drilled. This will enable a characterisation of the steering performance while drilling.

Furthermore, the beam equipped with at least one pair of strain gauge sensors can be mounted to the pin (threaded coupling) of the drill bit. In this configuration, the measurement of bending strain with rotation of the drill bit can provide an indication of heterogeneity in the formation, which allows the well to be steered based on the stratigraphy of rock strength.

Figure 5:
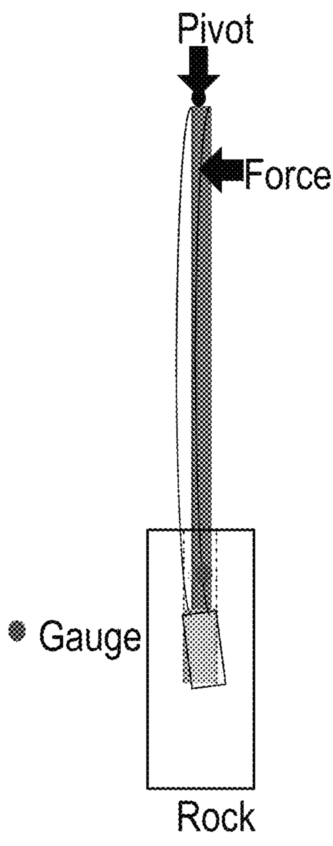
FIG. 5 is a schematic diagram of a testing apparatus for testing the device of FIGS. 3A and 3B.

The device of FIGS. 3A and 3B was rigidly attached to a drill collar and tested in a drilling machine both while drilling and while drilling and steering. FIG. 5 shows the test assembly, indicating the side force that was used to generate bending strain in the drill collar.

FIG. 6 shows the data measured by the device of FIGS. 3A and 3B during the drilling test. The line labeled "applied force" indicates the amplitude of the side force applied to the drilling assembly, while the lines labeled "Y strain" and "X strain" indicate the bending on orthogonal axes while drilling in rotary mode at 85 RPM.

The device(s) for measuring strain as described herein can be built as a single piece. Alternatively, the device(s) for measuring strain as described herein can be built with separate components to reduce costs. For the device of FIGS. 3A and 3B, it is critical that the beam 303 be rigidly coupled to the end-mounts 301A, 301B. Thus, care should be taken with manufacturing tolerances and coupling configurations. FIGS. 7A to 7D illustrate various configurations that can be used to rigidly fix and secure the beam 303 to the end-mounts 301A, 301B to ensure that bending is consistent in the beam 303.

To secure the strain gauge sensors to the beam for the devices described herein the individual strain gauge sensors and requisite wiring can be mounted to a single film, and then the film can be attached to the beam. This will make manufacture and assembly significantly easier. Other mounting methods can be used as well.

In another embodiment, one or more strain gauge sensors can be mounted on either one (or both) of the end-mounts as described herein and configured to measure strain perpendicular to the longitudinal axis of the beam on the end-mounts. This measurement characterizes a measure of the radial strain in the body of the drill system part (e.g., drill collar 111) and as such (once corrected for temperature changes) can indicate pressure inside the drilling tool.

Figure 8:
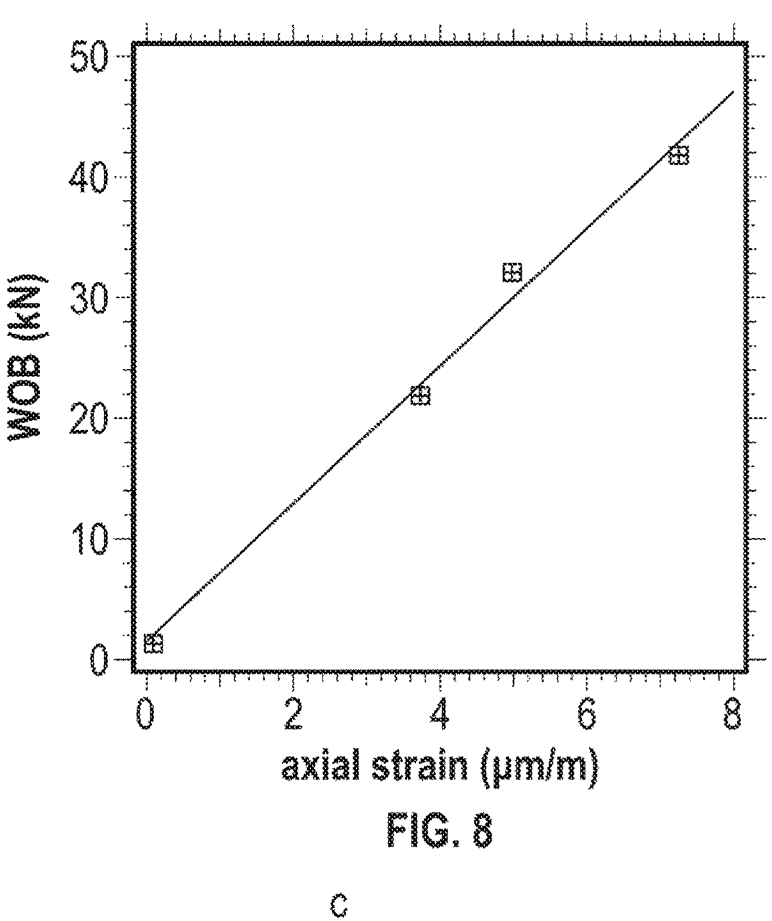
FIG. 8 shows a plot of the weight on bit (WOB) versus the axial strain measured by the strain gauge sensors mounted on the beam of the device of FIGS. 3A and 3B.

For example, the strain measurements can be used to derive weight on bit (WOB) and torque on bit (TOB) as described herein. FIG. 8 shows a plot of the weight on bit (WOB) versus the axial strain measured by the strain gauge sensors mounted on the beam of the device of FIGS. 3A and 3B.

In a pressurized environment, weight on bit (WOB) is more difficult to measure than torque on bit (TOB) because an increase in difference between the bore and annular pressures can cause the drilling tool to elongate, which results in a DC offset on the axial strain indicating a decrease in weight on bit (WOB). This may be dealt with by subtracting the offset if the pressure is constant. Alternatively, the pressure can also be monitored using pressure gauges. This is disadvantageous since a) it adds cost and b) introduces a leak path into the instrumentation pocket.

In another embodiment, the beam equipped with strain gauge sensors can be mounted either directly on the cover of an instrumentation pocket, or on a device attached to the cover. In this configuration, the strain gauge sensors can measure annular pressure. It is conceivable that this could also be applied to the drill collar either directly or indirectly. A change in the differential pressure will be reacted by a change in tension in the tangential direction in the drill collar. By adding strain gauge sensors to the end mounts of the device above and below the beam and mounting the device to the drill collar, the strain gauge sensors can be used to measure this change in tension and hence derive the differential pressure.

Figure 9:
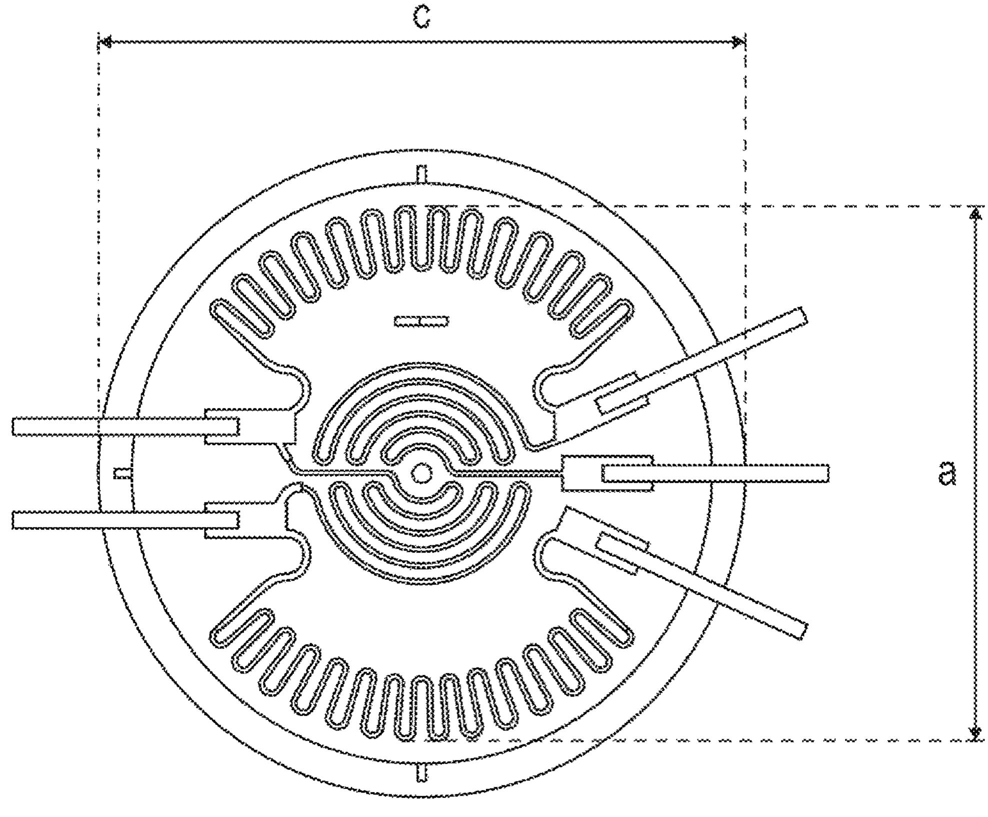
FIG. 9 is a schematic diagram of a diaphragm rosette strain gauge that can be configured to measure annular pressure in accordance with an aspect of the present disclosure.

In embodiments, the measurement of annular pressure can be made using a diaphragm rosette strain gauge as shown in FIG. 9. The diaphragm rosette strain gauge includes four (4) strain gauge sensors in a bridge configuration for pressure measurement application to remove contamination of the WOB channel due to pressure. This could be achieved by wiring, or by software on a microprocessor.

In yet other embodiments, the strain gauge sensors as described herein can take the form of bespoke foils that are applied to the measurement beam or drilling assembly (such as those found in the instrumented cutters and gauge pads).

Additive manufacturing could be used to create sensor structures which provide strain measurement with improved signal to noise ratio and removal of mechanical cross-talk.

In embodiments, the measurement beam can be equipped with strain gauge sensors and then mechanically fixed and secured to a drilling system part (e.g., drill collar).

In embodiments, the drilling system can employ one or more devices with a measurement beam equipped with strain gauge sensors as described herein. The device(s) can be configured to measure strain in the drilling system part (e.g., drill collar), The measured strain can be selected from bending strain, torsional strain, axial strain, or combinations thereof. The device(s) can be fixed and secured to a drilling system part (e.g., drill collar) in a single recess, one or more shared recess(es) or compartment, or in separate recesses or compartments.

In embodiments, the drilling system can employ three separate devices: a first device with a measurement beam equipped with strain gauge sensors for measuring bending strain as described herein (e.g., FIG. 2C), a second device with a measurement beam equipped with strain gauge sensors for measuring axial strain as described herein (e.g., FIG. 2D), and a third device with a measurement beam equipped with strain gauge sensors for measuring torsional strain as described herein (e.g., FIG. 2E). The three devices can be fixed and secured to a drilling system part (e.g., drill collar). The device(s) can be located in a single recess, one or more shared recess(es) or compartment, or in separate recesses or compartments in the drilling system part (e.g., drill collar).

In other embodiments, the drilling system can employ one or more devices with a measurement beam equipped with strain gauge sensors for measuring any combination of bending strain, torsional strain, axial strain as described herein (e.g., FIGS. 2C to 2E). The device(s) can be fixed and secured to the drilling system part (e.g., drill collar). The device(s) can be located in a single recess, one or more shared recess(es) or compartment, or in separate recesses or compartments in the drilling system part (e.g., drill collar).

Figure 10A:
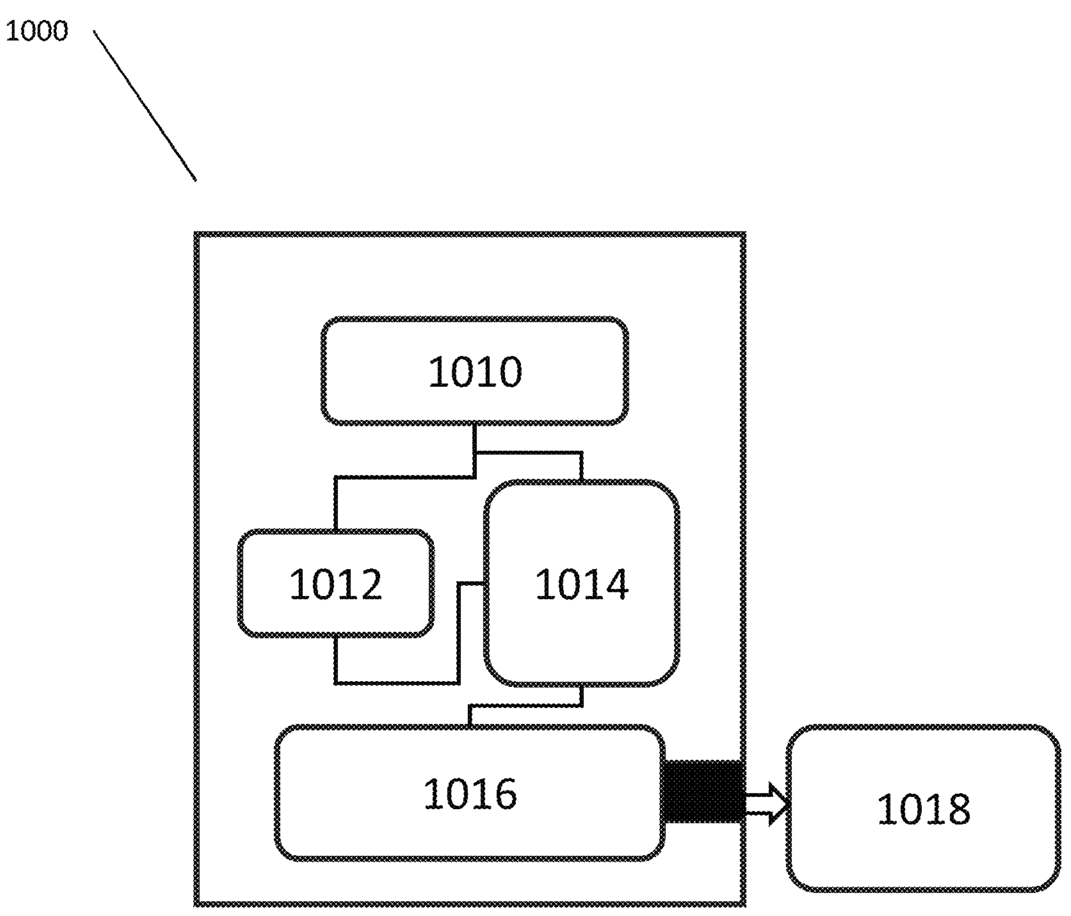
FIG. 10A illustrates a system with a device for measuring strain.

Additionally, various embodiments may employ an embodiment of a device for measuring strain, as described herein, that is connected to or part of a system 1000 of additional components to gather, process, and/or store the data from the strain gauges or sensors. For example, FIG. 10A illustrates a system with a device for measuring strain 1010 that may be electronically coupled to a processor 1012 that can receive and process strain data. The strain data, in some embodiments, can be used and/or processed to estimate the actual forces being generated at the bit end of a BHA while the device itself is positioned in another element further up the wellbore. Additionally, some embodiments may have a memory device 1014 in communication with the device to measure strain 1010 and/or the processor 1012. The memory device 1014 can be used to store strain measurement data that can later be used for future processing and/or downhole drilling operations. Accordingly, some embodiments of the system 1000 may have a media transfer device or interface 1016 that can be connected to an external media storage device 1018. Accordingly, the data either raw or processed can be extracted and further analyzed for future operations.

Figure 10B:
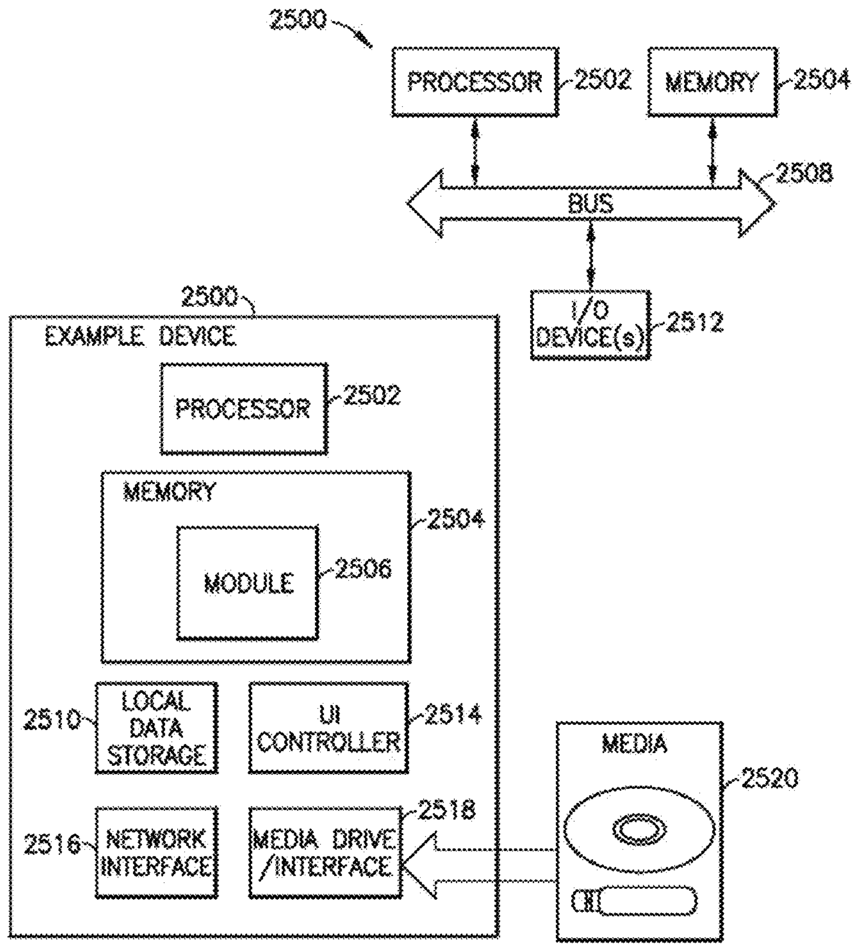
FIG. 10B is a block diagram of a computer processing system.

FIG. 10B illustrates a general example of a device 2500 that may be used in conjunction with or separate from a device for measuring strain. In some embodiments the device 2500 may have a processor 2502 and memory 2504 that can be configured to implement various embodiments of the processes and systems as discussed in the present application. For example, various steps or operations of the processes or systems as described herein can be embodied by computer program instructions (software) that execute on the device 2500. Memory 2504 can also host one or more databases and can include one or more forms of volatile data storage media such as random-access memory (RAM), and/or one or more forms of non-volatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can be one or more computing devices, programmable logic controllers (PLCs), etc.

Further, device 2500 should not be interpreted as having any dependency relating to one or a combination of components illustrated in device 2500. For example, device 2500 may include one or more computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes and systems of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Some of the methods and processes described above can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server over a communication network (e.g., the Internet).

Figure 11:
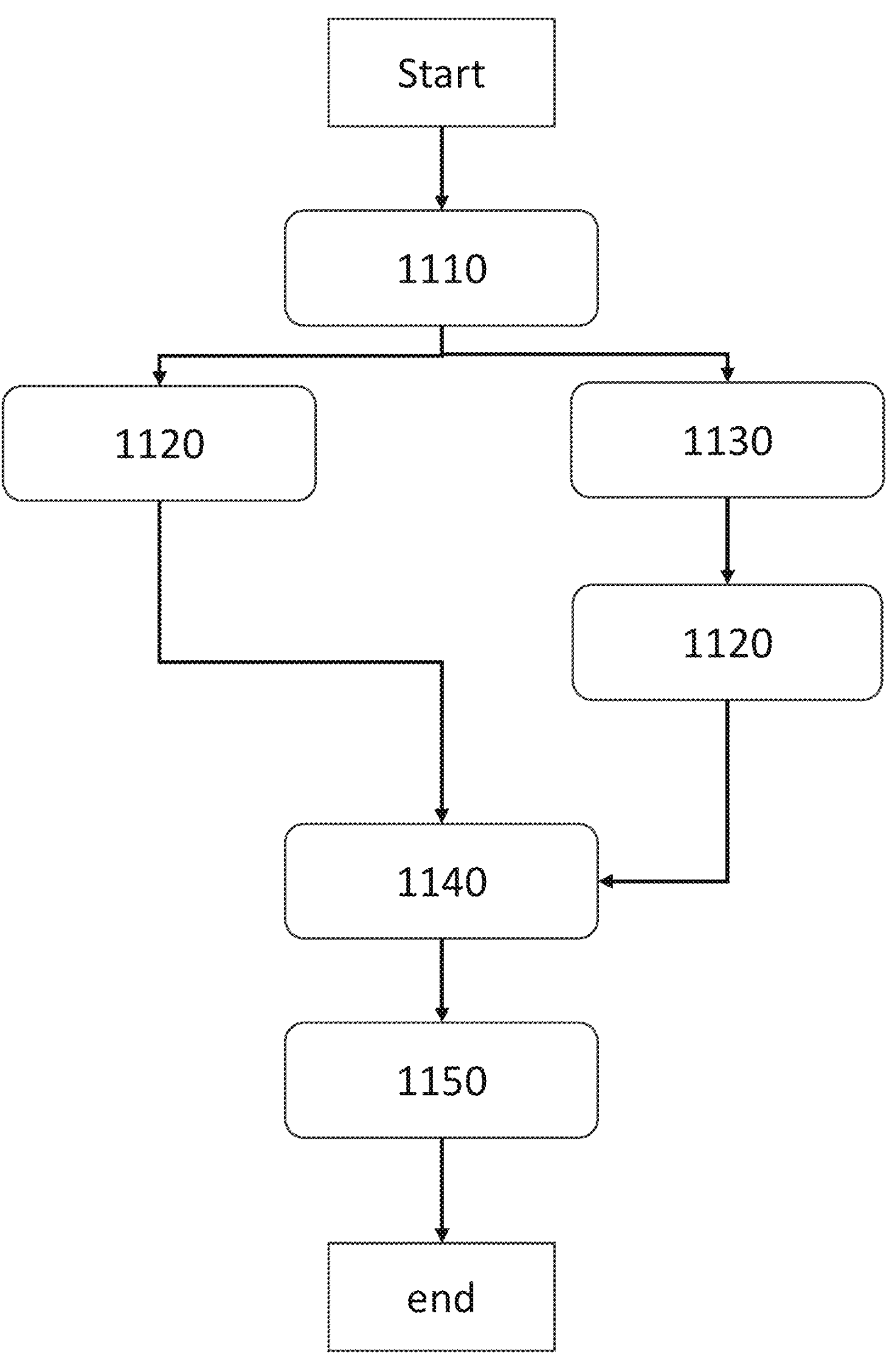
FIG. 11 illustrates a process for retrieving strain data.

Moving now to FIG. 11, embodiments of a process for retrieving strain data can be illustrated. For example, in many embodiments, the devices described herein can capture strain data (1110) from a strain measurement device. The strain data can then be stored (1120) in a memory device. In some embodiments, the strain data can be processed (1130) and then stored (1120) in a memory device or module. The stored data can remain in the memory module for future retrieval when the BHA, and data system, is/are removed from the wellbore (1140). After the system has been removed, a user can retrieve the data (1150) from the memory via any suitable method. For example, users can use a data storage device such as a USB to remove the data (1150) from the system.

As should be readily accepted, any of the embodiments of the measurement device and the applicable methods of measurement can be applied to any portion of the Bottom Hole Assembly (BHA) such as the drill bit, drill collar, reamers, or any portion of the drill pipe and various components. For example, referring back to FIG. 1, the BHA 106 may have various components such as drill pipe 108 and other attachment mechanisms that connect the drill string 105 to the bit 110. As can be appreciated, embodiments of the measurement device, illustrated throughout the specification, can be applied to any portion and/or any component of the BHA and can be in communication with any other sensor or measurement device within the BHA. Such devices can be used to measure and record the torque and other stresses seen within the BHA including at the bit. Additionally, the measurement device can be applied to or positioned in or near a reamer (not shown) that can be part of the BHA and used to open the wellbore for improved operations. For example, some embodiments may include a downhole system with a BHA and a strain measurement device, as described here, positioned in one or more locations within the BHA. This disclosure should not be limiting as to the position and use of the measurement device within the BHA.

The present disclosure relates to systems and methods for strain measurements according to any of the following:

Clause 1. A method for monitoring operational characteristics of a drilling system that includes a bottom hole assembly having a drill collar operably coupled to a drill bit, the method comprising: using an elongate beam with at least one pair of sensors that is rigidly secured to a part of the bottom hole assembly to measure strain in the part of the bottom hole assembly.

Clause 2. The method according to clause 1, further comprising: deriving a measurement of at least one operational parameter of the drilling system from the measured strain.

Clause 3. The method according to clause 2, wherein: the at least one pair of sensors is configured to measure bending strain in the part of the bottom hole assembly; and the at least one operational parameter is derived from the measured bending strain, wherein the at least one operational parameter comprises dog leg severity of a wellbore being drilled by the bottom hole assembly.

Clause 4. The method according to clause 3, further comprising: performing closed loop control of direction of drilling based on the dog leg severity derived from the measured bending strain.

Clause 5. The method according to clause 3, wherein: the at least one pair of sensors comprises a single pair of sensors configured to measure bending strain in the part of the bottom hole assembly as the bottom hole assembly rotates.

Clause 6. The method according to clause 3, wherein: the at least one pair of sensors comprises two pairs of sensors configured to measure bending strain in the part of the bottom hole assembly without requiring rotation of the bottom hole assembly.

Clause 7. The method according to clause 3, wherein: the at least one pair of sensors comprises two pairs of sensors configured to measure bending strain in the part of the bottom hole assembly in two orthogonal axes.

Clause 8. The method according to clause 3, further comprising: determining a measure of curvature of the bottom hole assembly from the measured bending strain using a correlation function that relates bending strain to curvature of the bottom hole assembly; and calculating the dog leg severity based on the measure of curvature of the bottom hole assembly.

Clause 9. The method according to clause 2, wherein: the at least one pair of sensors is configured to measure torsional strain in the part of the bottom hole assembly; and the at least one operational parameter is derived from the measured torsional strain, wherein the at least one operational parameter comprises torque on bit of the drilling system.

Clause 10. The method according to clause 2, wherein: the at least one pair of sensors is configured to measure axial strain in the part of the bottom hole assembly; and the at least one operational parameter is derived from the measured axial strain, wherein the at least one operational parameter comprises weight on bit of the drilling system.

Clause 11. The method according to clause 1, wherein: one or more devices with an elongate beam equipped with sensors is configured to measure strain in the part of the bottom hole assembly, wherein the measured strain is selected from bending strain, torsional strain, axial strain, or combinations thereof.

Clause 12. The method according to clause 1, wherein: the part of the bottom hole assembly comprises a drill collar.

Clause 13. The method according to clause 1, wherein: the part of the bottom hole assembly comprises a cover of an instrumentation pocket.

Clause 14. The method according to clause 1, wherein: the part of the bottom hole assembly comprises a pin of the drill bit.

Clause 15. A drilling system comprising: a bottom hole assembly having a drill collar operably coupled to drill bit; and an elongate beam equipped with at least one pair of sensors, wherein the beam and at least one pair of sensors are rigidly secured to a part of the bottom hole assembly and configured to measure strain in the part of the bottom hole assembly.

Clause 16. The drilling system according to clause 15, wherein: the at least one pair of sensors is configured to measure bending strain in the part of the bottom hole assembly.

Clause 17. The drilling system according to clause 16, wherein: the at least one pair of sensors comprises a single pair of sensors configured to measure bending strain in the part of the bottom hole assembly as the bottom hole assembly rotates.

Clause 18. The drilling system according to clause 16, wherein: the at least one pair of sensors comprises two pairs of sensors configured to measure bending strain in the part of the bottom hole assembly without requiring rotation of the bottom hole assembly.

Clause 19. The drilling system according to clause 16, wherein: the at least one pair of sensors comprises two pairs of sensors configured to measure bending strain in the part of the bottom hole assembly in two orthogonal axes.

Clause 20. The drilling system according to clause 15, wherein: the at least one pair of sensors is configured to measure torsional strain in the part of the bottom hole assembly.

Clause 21. The drilling system according to clause 15, wherein: the at least one pair of sensors is configured to measure axial strain in the part of the bottom hole assembly.

Clause 22. The drilling system according to clause 15, wherein: one or more devices with an elongate beam equipped with sensors is configured to measure strain in the part of the bottom hole assembly, wherein the measured strain is selected from bending strain, torsional strain, axial strain, or combinations thereof.

Clause 23. The drilling system according to clause 15, wherein: the part of the bottom hole assembly comprises a drill collar.

Clause 24. The drilling system according to clause 15, wherein: the part of the bottom hole assembly comprises a cover of an instrumentation pocket.

Clause 25. The drilling system according to clause 15, wherein: the part of the bottom hole assembly comprises a pin of the drill bit.

Clause 26. The drilling system according to clause 15, further comprising: end mounts that rigidly secure the elongate beam to the part of the bottom hole assembly.

Clause 27. The drilling system according to clause 26, further comprising: bolts that secure the end mounts to the part of the bottom hole assembly.

Clause 28. The drilling system according to clause 26, further comprising: structural epoxy applied at an interface of the end mounts and the part of the bottom hole assembly.

Clause 29. The drilling system according to clause 26, wherein: the end mounts, the elongate beam, and the at least one pair of sensors are disposed within a recess defined by the part of the bottom hole assembly.

Clause 30. The drilling system according to clause 26, wherein: the end mounts are equipped with sensors configured to measure strain in a direction orthogonal to the longitudinal axis of the beam.

Clause 31. In an embodiment, a drilling system includes a bottom hole assembly having a drill collar operably coupled to drill bit; and a strain measurement device connected to the drill collar, wherein the strain measurement device includes a first end and a second end and an elongated central beam disposed between the first end and the second end, the first end and the second end having a plurality of attachment points wherein the strain measurement device can be attached to the drill collar, and a plurality of strain sensors attached to the elongated central beam wherein at least one of the plurality of strain sensors is configured to measure torque strain on the strain measurement device, at least a second of the plurality of strain sensors is configured to measure load strain on the strain measurement device, and at least a third of the plurality of strain sensors is configured to measure bending strain on the strain measurement device.

Clause 32. The drilling system of clause 31, wherein the central elongated beam further comprises a central channel that runs axially along the length of the strain measurement device, the channel having a thickness wherein the thickness is defined by an outer wall and an inner wall.

Clause 33. The drilling system of clause 32, wherein the central elongated beam has a first section and a second section wherein the thickness of the first section is different from the second section.

Clause 34. The drilling system of clause 32, wherein each of the plurality of strain sensors are disposed within the central channel.

Clause 35. The drilling system of clause 33, wherein at least one of the plurality of strain sensors are disposed in the first section and at least one of the plurality of strain sensors are disposed in the second section.

Clause 36. In an embodiment, a drilling system includes a bottom hole assembly having a drill collar operably coupled to drill bit; and a strain measurement system connected to the drill collar, wherein the strain measurement system includes a strain measurement apparatus having a first end and a second end and an elongated central beam disposed between the first end and the second end, the first end and the second end having a plurality of attachment points wherein the strain measurement device can be attached to the drill collar, and a plurality of strain sensors attached to the elongated central beam wherein at least one of the plurality of strain sensors is configured to measure torque strain on the strain measurement device, at least a second of the plurality of strain sensors is configured to measure load strain on the strain measurement device, and at least a third of the plurality of strain sensors is configured to measure bending strain on the strain measurement device; and an electronic system coupled to the strain measurement apparatus, wherein the electronic system comprises a processor and a memory storage device.

While embodiments disclosed herein may be used in the oil, gas, hydrocarbon exploration or production environments, or in the production of other natural resources, such environments are merely illustrative. Systems, tools, assemblies, methods, devices, and other components of the present disclosure, or which would be appreciated in view of the disclosure herein, may be used in other applications and environments. In other embodiments, embodiments of the present disclosure may be used outside of a downhole environment, including in connection with the placement of utility lines, or in the automotive, aquatic, aerospace, hydroelectric, manufacturing, or telecommunications industries.

In the description herein, various relational terms may be used to facilitate an understanding of various aspects of some embodiments of the present disclosure. Relational terms such as "bottom," "below," "top," "above," "back," "front," "left," "right," "rear," "forward," "up," "down," "horizontal," "vertical," "clockwise," "counterclockwise," "upper," "lower," and the like, may be used to describe various components, including their operational or illustrated position relative to one or more other components. Relational terms do not indicate a particular orientation for each embodiment within the scope of the description or claims, but are intended for convenience in facilitating reference to various components. Thus, such relational aspects may be reversed, flipped, rotated, moved in space, placed in a diagonal orientation or position, placed horizontally or vertically, or similarly modified.

Certain descriptions or designations of components as "first," "second," "third," and the like are also used to differentiate between identical components or between components which are similar in use, structure, or operation. Such language is not intended to limit a component to a singular designation or require multiple components. As such, a component referenced in the specification as the "first" component may be the same or different than a component that is referenced in the claims as a "first" component, and a claim may include a "first" component without requiring the existence of a "second" component.

Furthermore, while the description or claims may refer to "an additional" or "other" element, feature, aspect, component, or the like, it does not preclude there being a single element, or more than one, of the additional element. Where the claims or description refer to "a" or "an" element, such reference is not to be construed that there is just one of that element, but is instead to be inclusive of other components and understood as "at least one" of the element. It is to be understood that where the specification states that a component, feature, structure, function, or characteristic "may," "might," "can," or "could" be included, that particular component, feature, structure, or characteristic is provided in certain embodiments, but is optional for other embodiments of the present disclosure. The terms "couple," "coupled," "connect," "connection," "connected," "in connection with," and "connecting" refer to "in direct connection with," or "in connection with via one or more intermediate elements or members." Components that are "integral" or "integrally" formed include components made from the same piece of material, or sets of materials, such as by being commonly molded or cast from the same material, in the same molding or casting process, or commonly machined from the same piece of material stock. Components that are "integral" should also be understood to be "coupled" together.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Although various example embodiments have been described in detail herein, those skilled in the art will readily appreciate in view of the present disclosure that many modifications are possible in the example embodiments without materially departing from the present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

What is claimed is:

1. A drilling system comprising:

a bottom hole assembly having a drill collar operably coupled to a drill bit; and a strain measurement device connected to the drill collar, wherein the strain measurement device comprises:

a first end and a second end and an elongated central beam disposed between the first end and the second end, the first end and the second end having a plurality of attachment points, wherein each of the first end and the second end has a thin portion and a raised portion, and wherein the raised portion is configured to connect to the elongated central beam, and a plurality of strain sensors attached to the elongated central beam, wherein at least a first of the plurality of strain sensors is configured to measure torque on the strain measurement device, at least a second of the plurality of strain sensors is configured to measure load on the strain measurement device, and at least a third of the plurality of strain sensors is configured to measure bending on the strain measurement device.

2. The drilling system of claim 1, wherein the elongated central beam further comprises a central channel that runs axially along the length of the strain measurement device, the central channel having a thickness defined by an outer wall and an inner wall.

3. The drilling system of claim 2, wherein the elongated central beam has a first section and a second section, and wherein the thickness of the first section is different from the thickness of the second section.

4. The drilling system of claim 2, wherein each of the plurality of strain sensors is disposed within the central channel.

5. The drilling system of claim 3, wherein at least one of the plurality of strain sensors is disposed in the first section and at least another one of the plurality of strain sensors is disposed in the second section.

6. The drilling system of claim 1, wherein the first end and the second end each have at least two attachment points.

7. The drilling system of claim 1, wherein the first end and the second end each further comprise at least one cutout portion.

8. A drilling system comprising:

a bottom hole assembly having a drill collar operably coupled to a drill bit; and a strain measurement system connected to the drill collar, wherein the strain measurement system comprises:

a strain measurement apparatus having a first end and a second end and an elongated central beam disposed between the first end and the second end, the first end and the second end having a plurality of attachment points, wherein the elongated central beam includes a central channel that runs axially along a length of the strain measurement apparatus, the central channel having a thickness, wherein the thickness is defined by an outer wall and an inner wall, wherein the elongated central beam has a first section and a second section, and wherein the thickness of the first section is different from the thickness of the second section, and a plurality of strain sensors attached to the elongated central beam, wherein at least one of the plurality of strain sensors is disposed in the first section and at least another one of the plurality of strain sensors is disposed in the second section, and wherein at least a first of the plurality of strain sensors is configured to measure torque on the strain measurement apparatus, at least a second of the plurality of strain sensors is configured to measure load on the strain measurement apparatus, and at least a third of the plurality of strain sensors is configured to measure bending on the strain measurement apparatus; and an electronic system coupled to the strain measurement apparatus, wherein the electronic system comprises a processor and a memory storage device.

9. The drilling system of claim 8, further comprising a media transfer interface, electronically connected to the memory storage device, such that the drilling system is configured to be connected to an external memory storage device.

10. The drilling system of claim 8, wherein each of the plurality of strain sensors is disposed within the central channel.

11. The drilling system of claim 8, wherein the first end and the second end each have at least two attachment points.

12. The drilling system of claim 8, wherein the first end and the second end each further comprise at least one cutout portion.

13. The drilling system of claim 8, wherein each of the first end and the second end has a thin portion and a raised portion, and wherein the raised portion is configured to connect to the elongated central beam.

14. A bottom hole assembly comprising:

a plurality of bottom hole drill components connected to form the bottom hole assembly; and a strain measurement device connected to at least one of the plurality of bottom hole drill components, wherein the strain measurement device comprises:

a first end and a second end and an elongated central beam disposed between the first end and the second end, the first end and the second end having a plurality of attachment points, wherein each of the first end and the second end has a thin portion and a raised portion, and wherein the raised portion is configured to connect to the elongated central beam, and a plurality of strain sensors attached to the elongated central beam, wherein at least a first of the plurality of strain sensors is configured to measure torque on the strain measurement device, at least a second of the plurality of strain sensors is configured to measure load on the strain measurement device, and at least a third of the plurality of strain sensors is configured to measure bending on the strain measurement device.

15. The bottom hole assembly of claim 14, wherein the at least one of the plurality of bottom hole drill components is a reamer, and wherein the strain measurement device is connected to the reamer.

16. The bottom hole assembly of claim 14, wherein the at least one of the plurality of bottom hole drill components is a drill bit having a drill collar, and wherein the strain measurement device is connected to the drill collar.

* * * * *